United States Patent [19]

Robinson

[11] Patent Number: 4,934,525

[45] Date of Patent: Jun. 19, 1990

[54] COFFEE SAMPLER CONTAINER AND ASSEMBLY

[76] Inventor: Gordon S. Robinson, 1A Shadow Brook Ln., Smithfield, R.I. 02917

[21] Appl. No.: 451,641

[22] Filed: Dec. 18, 1989

Related U.S. Application Data

[63] Continuation-in-part of Ser. No. 411,633, Sep. 25, 1989, abandoned.

[51] Int. Cl.$^5$ .................... B65D 77/04; A45C 11/20
[52] U.S. Cl. ................................ 206/217; 206/545; 206/546; 206/568
[58] Field of Search ............... 206/217, 545, 546, 568

[56] References Cited

U.S. PATENT DOCUMENTS 2,645,332  7/1953  Martin et al. .................... 206/545
4,417,504  11/1983  Yamamoto ..................... 206/217 X
4,756,424  7/1988  Schwartz ........................ 206/217 X

FOREIGN PATENT DOCUMENTS 1347143  11/1963  France .............................. 206/217

Primary Examiner—William I. Price
Attorney, Agent, or Firm—Barlow & Barlow, Ltd.

[57] ABSTRACT

A coffee sampler kit is provided with a container that resembles a giant coffee mug and has an inner wall with a retainer groove into which a cap of a bottle is received. A divider plate separates the lower portion from the upper and the plate also supports additional articles such as coffee flavored products or articles and includes in some cases tumblers and mugs. All of the space may be used by additional coffee products including but not limited to extract, candy, gelatin mix and brewing coffee.

6 Claims, 2 Drawing Sheets

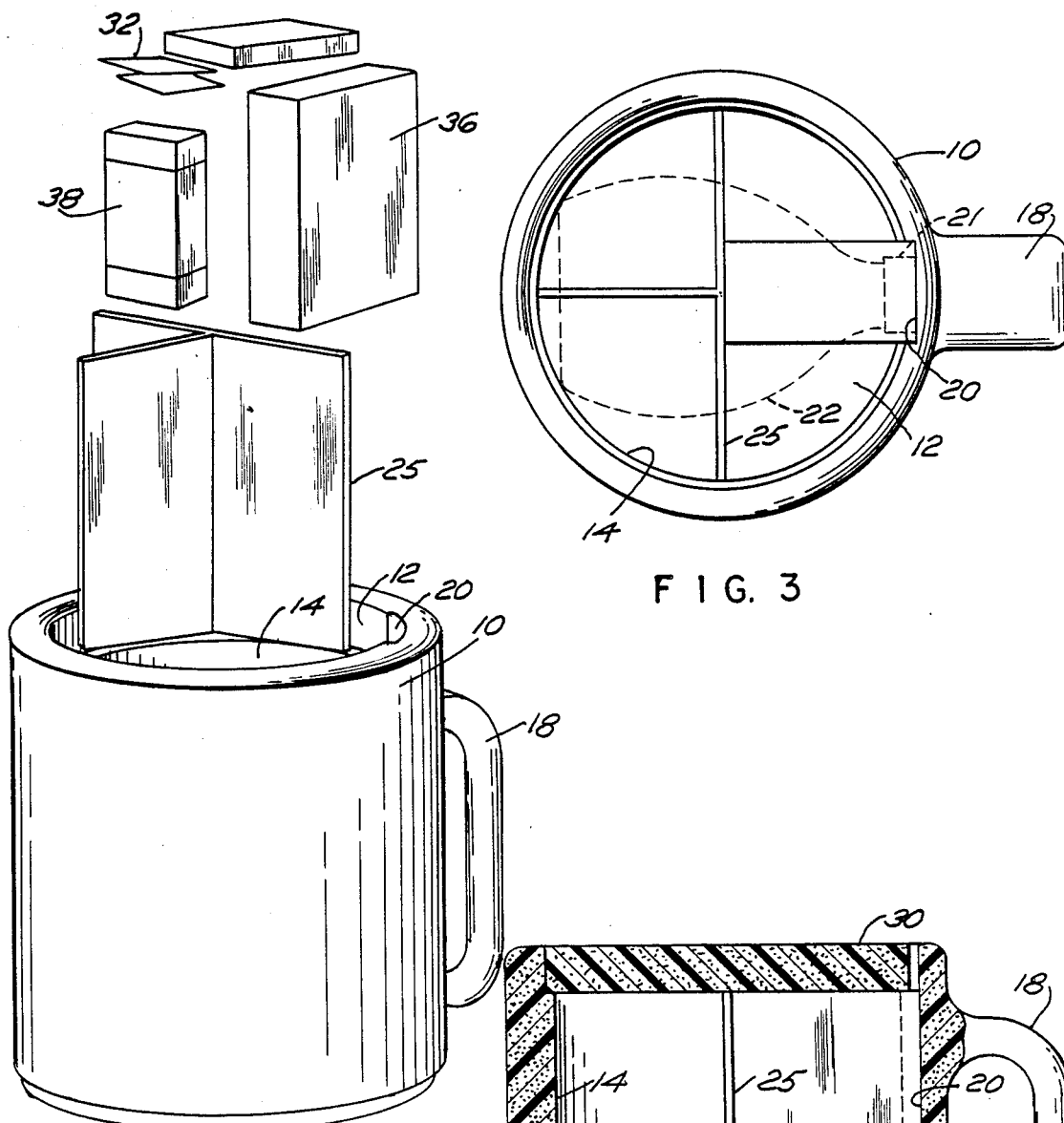
FIG. 1
FIG. 3
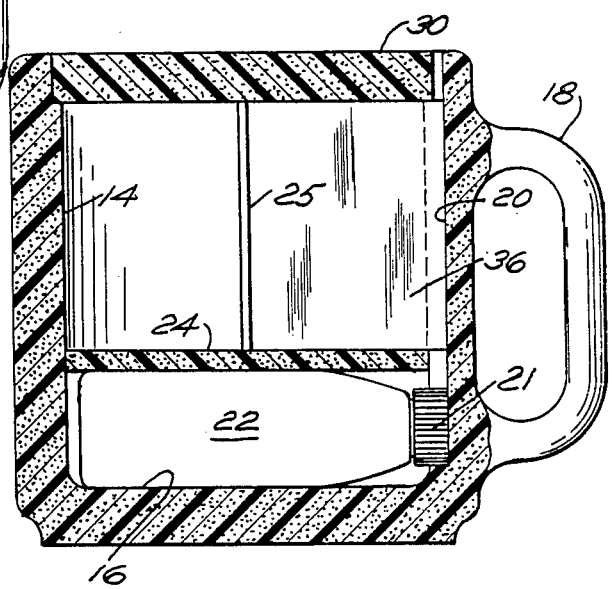
FIG. 2

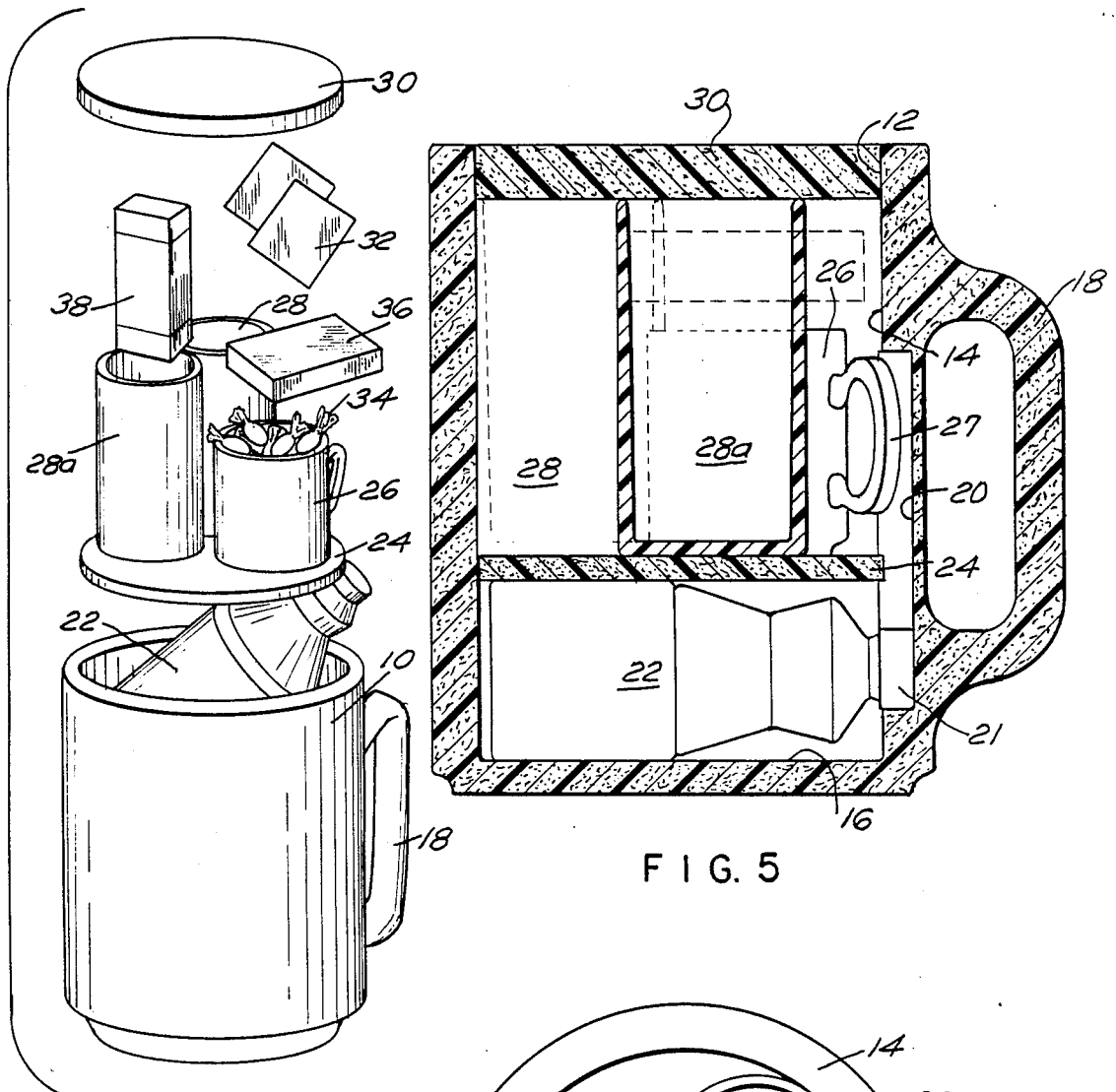
FIG. 4
FIG. 5
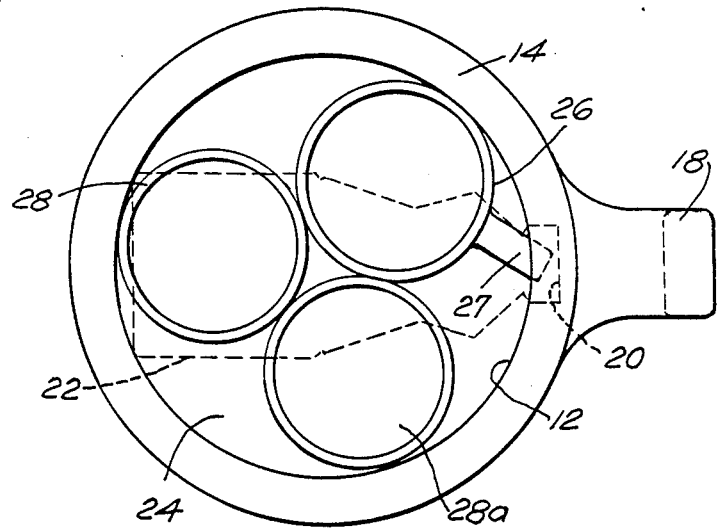
FIG. 6

COFFEE SAMPLER CONTAINER AND ASSEMBLY

CROSS-REFERENCE TO RELATED APPLICATION

This application is a continuation-in-part of my prior application Ser. No. 07/411,633, filed Sept. 25, 1989 now abandoned.

BACKGROUND OF THE INVENTION

The present invention relates to a container which is useful for traveling and permits one to provide at least a means of making coffee milk drinks, brewing coffee beverage and storing coffee flavored items including candy.

There are many occasions when one who enjoys the coffee flavor cannot obtain that in certain parts of the United States. Travelers, therefore, have a need for a small, self-contained unit which has a provision for containing and retaining in a package form various coffee flavored ingredients which container also houses instrumentalities for storing tumblers and hot mugs.

In the prior art there are some examples of coffee kits in the form of containers that are provided for the purpose of preparing coffee as for example Yamamoto, U.S. Pat. No. 4,417,504, which provides a drip coffee body with packets of coffee together with a coffee cup, filter paper and spoons (206-217 xr). Another form of a multipurpose container is seen in Schwartz, U.S. Pat. No. 4,756,424, which stores the ingredients for making beverages together with the mugs and an electric heating device (206-217 xr). Martin et al, U.S. Pat. No. 2,645,332 illustrates a lunch pail with dividers for holding a bottle separate from other articles. (206-546 xr) As far as I am aware, none of the above defined prior art devices nor anything known to me on the market provides a low cost, self-contained beverage unit which will store all the necessary elements, particularly for making coffee flavored beverages together with sundry coffee flavored items.

SUMMARY OF THE INVENTION

The invention is directed to a compact kit known as a coffee sampler which includes the necessary syrup and flavored packets which may be used to make coffee milk, coffee beverage and may also contain coffee flavored candy. In one form, it has all the necessary utensils for consuming a beverage. For this purpose, the coffee sampler or kit may be molded of plastic as, for example, a thick wall Styrofoam ® and includes an insert member or divider plate which is received within the container to make two compartments, a lower compartment where a syrup bottle may be received and an upper compartment where there are stored prepackaged individual coffee flavored items. In one form, a mug and tumblers are also stored and in this case, stored within the tumblers and the mug are additional coffee flavored items. It is accordingly a principal object of the invention to provide a compact coffee sampler kit which is adapted to contain all of the necessary ingredients for brewing coffee, making coffee milk shakes or the like, and which is easy to carry and compact and which contains provisions for storing brewed powered coffee and which, in one form, provides for the storage of a coffee mug and tumblers.

BRIEF DESCRIPTION OF THE DRAWING

FIG. 1 is a detached, perspective view of the coffee sampler kit;
FIG. 2 is a vertical section taken through the kit;
FIG. 3 is a top plan view with the cover removed;
FIG. 4 is a detached perspective view of another form;
FIG. 5 is a vertical section thereof; and
FIG. 6 is a top plan view thereof illustrating packaging of the mug and tumblers.

DESCRIPTION OF THE PREFERRED EMBODIMENT

Referring to the figures of the drawing, a coffee sampler kit, according to the invention, is illustrated as a container 10 which may be of molded plastic such as Styrofoam ® or the like and which is adapted to receive the various articles. The container has substantially an open top as at 12, a substantially cylindrical wall 14 and a bottom wall 16. The container is also provided with a lifting handle 18 that is formed integrally with the side wall of the container.

The various components as they are packaged is seen best in FIG. 2 and FIG. 3. It will be seen that the inner wall 14 is provided with a groove 20 and received in the groove 20 is the cap 21 of a syrup bottle 22 which lies against the bottom wall 16. A divider plate or false bottom 24 lies over the coffee syrup container and it will be appreciated that from either side of the coffee syrup there is space for storing various articles, all of which will be retained in position by the false bottom or divider plate 24. Resting on the divider plate 24 is a vertical divider 25 that is T shaped with a main panel that will diametrically divide the interior of the container and a small panel at right angles thereto. As seen in FIG. 1 a plurality of articles such as powdered coffee 32, coffee flavored gelatin 36, coffee flavored extract 38 and other articles may be packed about the vertical divider, which keeps the articles from moving about the container in shipment. A top or cover 30 is fitted snugly into the open top 12 and secures the contents.

Referring to FIGS. 4-6 an alternate form of sampler is illustrated in which the same reference numerals refer to like parts. In this form, however, there is resting on the divider plate 24 or false bottom a coffee mug 26 and a pair of tumblers 28, 28a. The coffee mug has a handle 27 and this handle is received in the groove 20 that forms a recess leading radially outwardly from the inner wall 14. As seen in FIG. 6, the coffee mug and tumblers are arranged in such a way that they are received in rather tight formation within the container. As seen in FIG. 4 within the tumblers and within the coffee mug, a variety of other products are received as, for example, powered coffee 32, coffee flavored candies 34 and coffee flavored gelatin 36, coffee extract 38 and various other coffee flavored articles. To retain the members together, a top or cover 30 is fitted into the open top 12 which tightly secure the parts in position for shipping and carrying about. Alternately, should the container be molded of a hard plastic or a harder material, a snap-on cover in lieu of a press-on cover could fit over the open top of the container.

The invention is designed to introduce coffee flavored items in a variety of forms to a vast area of the country that has never heard of coffee milk, coffee ice cream, coffee gelatin, coffee flavored candies and the like. While coffee hot and cold is consumed at a staggering rate, the other forms are known only in New England and the kit is therefore developed to provide an inexpensive method of introducing the flavors to the country and is formed as a giant coffee mug.

I claim:

1. A coffee sampler kit comprising a container having an open top, inner, outer and bottom walls, said inner wall having a groove therein from the bottom wall to the open top, a syrup bottle with a raised cap, a divider plate over said bottle, the raised cap fitting in said groove so that the bottle lies against the bottom wall, a plurality of packages resting on the divider plate, said plate retaining the bottle in place against the bottom wall.

2. A coffee sampler kit as in claim 1 wherein a mug with a handle rests on the divider plate, the mug handle fitting in said groove.

3. A coffee sampler kit as in claim 1 wherein vertical separator plates rest on the divider plate to create compartments into which coffee flavored material may be stored.

4. A coffee sampler kit as in claim 1 wherein a top having an outer dimension greater than the inner dimensions of the container is frictionally received therein.

5. A coffee sampler kit as in claim 2 wherein said mug is filled with packages of coffee flavored material which are removable.

6. A coffee sampler kit as in claim 4 wherein the container is cylindrical and the top is a circular disc.

* * * * *